United States Patent
Allegri et al.

(10) Patent No.: US 12,306,110 B2
(45) Date of Patent: May 20, 2025

(54) 3D IMAGE ACQUISITION SYSTEM FOR OPTICAL INSPECTION AND METHOD FOR OPTICAL INSPECTION OF OBJECTS, IN PARTICULAR ELECTRONIC ASSEMBLIES, ELECTRONIC BOARDS AND THE LIKE

(71) Applicant: Scuola universitaria professionale della Svizzera italiana (SUPSI), Manno (CH)

(72) Inventors: Daniele Guido Allegri, Claro (CH); Roberto Gardenghi, Motto (CH)

(73) Assignee: SCUOLA UNIVERSITARIA PROFESSIONALE DELLA SVIZZERA ITALIANA (SUPSI), Manno (CH)

( * ) Notice: Subject to any disclaimer, the term of this patent is extended or adjusted under 35 U.S.C. 154(b) by 173 days.

(21) Appl. No.: 18/014,263

(22) PCT Filed: Jul. 3, 2020

(86) PCT No.: PCT/EP2020/068858
§ 371 (c)(1),
(2) Date: Jan. 3, 2023

(87) PCT Pub. No.: WO2022/002414
PCT Pub. Date: Jan. 6, 2022

(65) Prior Publication Data
US 2023/0204519 A1    Jun. 29, 2023

(51) Int. Cl.
*G01N 21/88* (2006.01)
*G01N 21/956* (2006.01)

(52) U.S. Cl.
CPC ..... *G01N 21/8851* (2013.01); *G01N 21/8806* (2013.01); *G01N 21/95684* (2013.01);
(Continued)

(58) Field of Classification Search
CPC ........... G01N 21/8851; G01N 21/8806; G01N 21/95684; G01N 2021/8835;
(Continued)

(56) References Cited

U.S. PATENT DOCUMENTS 7,599,071 B2    10/2009    Dillon et al.
10,041,788 B2*   8/2018    Pettersson .......... G01B 11/2545
(Continued)

FOREIGN PATENT DOCUMENTS

JP    2004045266 A  *  2/2004
JP    2006337286 A     12/2006
WO   2004031754 A1    4/2004

OTHER PUBLICATIONS

Chao Zuo et al., "Phase shifting algorithms for fringe projection profilometry: A review" in Optics and Lasers in Engineering, 109:23 59, Oct. 2018.
(Continued)

*Primary Examiner* — Isiaka O Akanbi
(74) *Attorney, Agent, or Firm* — CANTOR COLBURN LLP

(57) ABSTRACT

An automatic 3D image acquisition system for optical inspection of objects (B) includes one or more light sources (including a laser source) configured to emit a light toward a field of view wherein an object (B) to be inspected is placed, and at least one digital sensor that acquires at least part of the light reflected by the object (B) to be inspected. The digital sensor includes and intensity sensor and is operatively connected to a data processing unit configured to determine physical and/or geometric features of the object (B) to be inspected on the basis of the light acquired by the digital sensor.

The automatic optical inspection system includes an image intensifier apparatus and optical elements which define a path of the laser light pulse from the laser source to the field of view and from the field of view to the image intensifier apparatus.

16 Claims, 5 Drawing Sheets

(52) U.S. Cl.
CPC ............... *G01N 2021/8835* (2013.01); *G01N 2021/8848* (2013.01); *G01N 2021/8887* (2013.01); *G01N 2021/95638* (2013.01)

(58) Field of Classification Search
CPC ............. G01N 2021/8848; G01N 2021/8887; G01N 2021/95638; G01B 2210/56; G01B 11/0608; G01B 11/25
USPC ............................ 356/601–624, 237.2–237.6
See application file for complete search history.

(56) References Cited

U.S. PATENT DOCUMENTS

| | | | | |
|---|---|---|---|---|
| 2002/0158872 | A1* | 10/2002 | Randel | G06T 15/405 345/426 |
| 2008/0117438 | A1* | 5/2008 | Quirion | G01B 11/2509 356/610 |
| 2008/0231835 | A1* | 9/2008 | Iizuka | G01S 17/89 356/601 |
| 2008/0279446 | A1* | 11/2008 | Hassebrook | G01B 11/2513 382/154 |
| 2011/0102320 | A1* | 5/2011 | Hauke | G06F 3/0304 345/158 |
| 2012/0229816 | A1* | 9/2012 | Rodrigue | G01B 11/25 356/610 |

OTHER PUBLICATIONS

International Search Report for International Application No. PCT/EP2020/068858, International Filing Date Jul. 3, 2022, Date of Mailing Nov. 8, 2021, 4 pages.

Written Opinion for International Application No. PCT/EP2020/068858, International Filing Date Jul. 3, 2022, Date of Mailing Nov. 8, 2021, 6 pages.

* cited by examiner

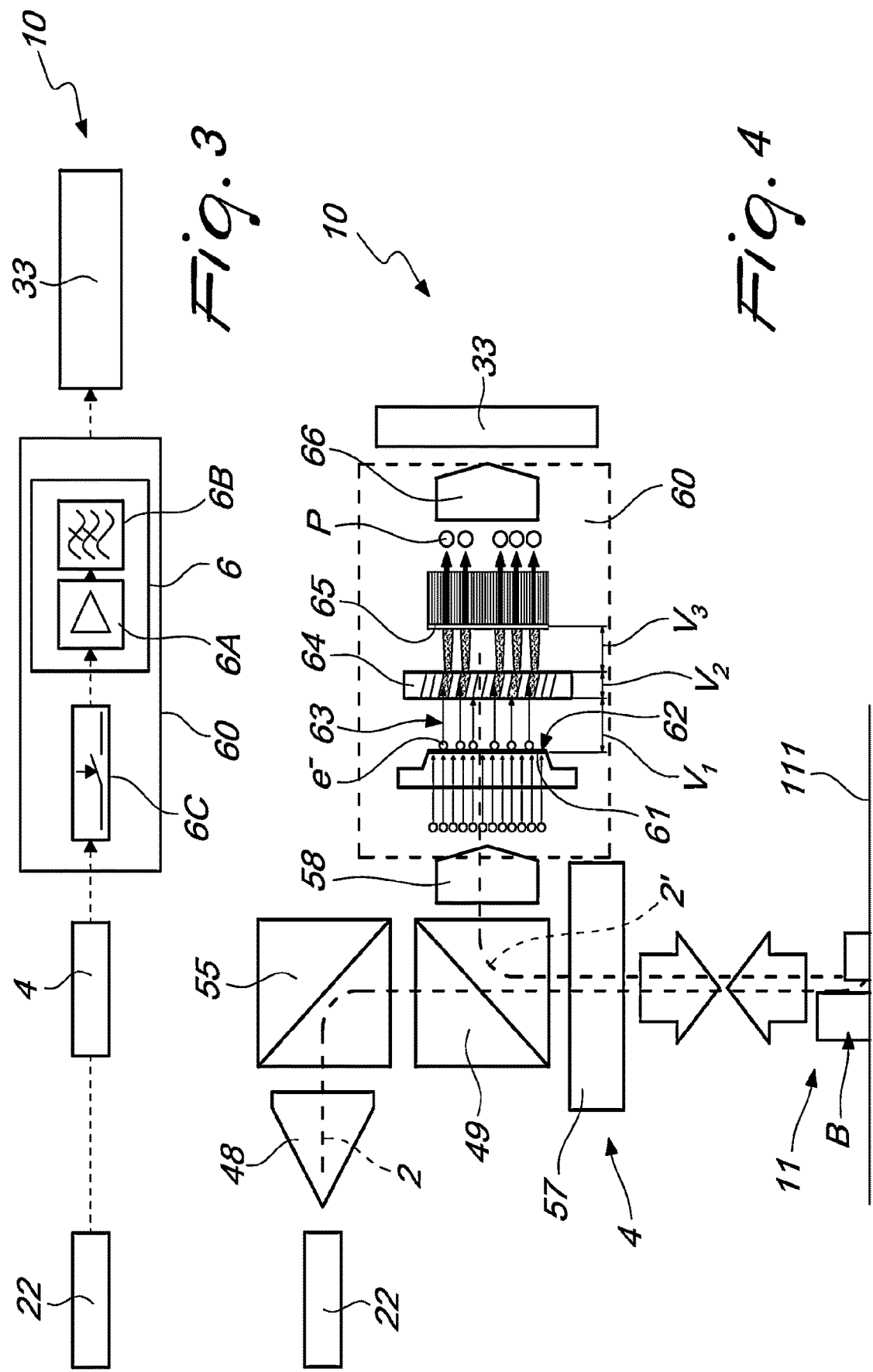

3D IMAGE ACQUISITION SYSTEM FOR OPTICAL INSPECTION AND METHOD FOR OPTICAL INSPECTION OF OBJECTS, IN PARTICULAR ELECTRONIC ASSEMBLIES, ELECTRONIC BOARDS AND THE LIKE

CROSS-REFERENCE TO RELATED APPLICATIONS

This application is a National Stage application of PCT/EP2020/068858, filed on 3 Jul. 2020, the contents of which are herein incorporated by reference in their entirety.

TECHNICAL FIELD

The present disclosure relates to an automatic 3d image acquisition system for the optical inspection of objects, in particular electronic assemblies, electronic boards and the like. Commonly, the above system is also called automatic optical inspection probe. The present disclosure also relates to a method for the optical inspection of objects.

BACKGROUND

As known, machine vision systems for visual quality inspection are widely applied in high-volume manufacturing, semiconductor, food and pharmaceutical industries and rely on standard image processing and computer vision techniques such as edge detection, connected component analysis, texture analysis, and projective geometry.

These approaches are simple and highly effective when the need is to perform quantitative measurement of well-defined entities (such as lengths, heights, colors, fine-grained patterns); once the measurements are completed, simple rule-based tools can be used to assess whether an observed product meets acceptance criteria.

In particular, in this field, the expression "automatic optical inspection" (AOI) generally refers to an automated visual quality inspection system for objects (which can consist of electronic assemblies, such as Printed Circuit Boards, namely PCBs and Surface Mount Technology, namely SMT) wherein a camera autonomously scans the object under test. In particular, in the case of electronic assemblies, the camera allows to identify both manufacturing failures (e.g. missing components) and quality defects (e.g. fillet size or shape e or component skew). AOI are commonly used in the manufacturing process because they are non-contact test methods. They are implemented at many stages through the manufacturing process including bare board inspection, solder paste inspection (SPI), pre-reflow and post-reflow as well as other stages.

In substance, all the automatic optical inspection systems require to project a light on the object to be inspected and to acquire the light reflected by the object by means of a digital sensor; the acquired images are analyzed by a processing unit configured to determine physical and/or geometric features of the object to be inspected on the basis of the light acquired by the sensor.

Nowadays, in the field of the automated visual quality inspection systems for electronic assemblies, there is an increasing need to capture coordinated measurements inline.

As today's boards complexity is increasing with more components, more joints, higher density, and new package technologies such as 01005 size and even 008004 size microchips, 2D automatic optical inspection technology using grey-scale image analysis or angles camera view of color images may no longer be a viable option.

Over the course of the years, to overcome these limitations, 3D sensor technology has been effectively combined with AOI and is now utilized for many applications such as inspection of microelectronics and sub-100-micron solder paste deposits and other challenging applications.

Automatic optical inspection systems using structured light, and in particular phase shift profilometry (PSP) are also known, for instance:

U.S. Pat. No. 7,599,071B2 discloses a measurement system for determining positional error of an optical component using structured light patterns; and Chao Zuo et al., "Phase shifting algorithms for fringe projection profilometry: A review" (in Optics and Lasers in Engineering, 109:23-59, 2018) describes the use of phase shift profilometry in optical inspection systems.

Although functional, these known systems have limitations and present some disadvantages and limitations. In particular some limitations derive from the nature of the measurement technique, other are more particularly related to the measure of electronic assemblies (SMT and PCBs) and include:

difficulty in ensuring complete measurement of low components near tall components due to the shadowing effect (if the pattern is projected at an angle, tall features may cast a shadow, preventing measurement of nearby low features);

difficulty in avoiding measurement errors caused by multiple reflections among components (multiple specular reflections among shiny features, such as solder joints, tinned leads and metal oscillators, can cause distortions in the fringe pattern and errors in the height measurements);

difficulty in guaranteeing fast, highly accurate and repeatable measurements in the micrometer ($\mu m$) range in all directions.

FIGS. 1A-1B show a known optical inspection system comprising PSP techniques, developed to overcome the shadowing effect, wherein a fringe pattern of light L is projected by a projector P, from different directions (i.e. firstly from a first direction as depicted in FIG. 1A, and then from a second direction as depicted in FIG. 1B) on the board B to be inspected. For each stage, the reflected light L', L" is collimated and/or focused by optics elements T (such as a telecentric optics system) and acquired by a camera C generating a respective view. Then the different views are combined in a single image.

Although this approach is able to generate high-quality images, it is time consuming due to the high number of images that has to be acquired and processed (in particular, for each direction at least three images for phase shift profilometry and 3 images for phase unwrapping have to be acquired, that means 12 images in total for at least two different directions of projection).

SUMMARY

The aim of the present disclosure is to provide an automatic optical inspection system that is capable of improving the background art in one or more of the aspects indicated above.

Within the scope of this aim, the disclosure provides an automatic optical inspection system that is capable of improving the acquisition performance.

Moreover, the present disclosure provides an automatic optical inspection system that is capable of improving the acquisition speed.

The present disclosure also provides an automatic optical inspection system that makes it possible to avoid measurement errors caused by multiple reflections among components.

The present disclosure further provides an automatic optical inspection system that is highly reliable, relatively easy to manufacture and at competitive costs.

This aim, as well as these and other advantages that will become better apparent hereinafter, are achieved by providing an automatic optical inspection system according to claim 1.

This aim and these advantages are also achieved by a method according to claim 14.

BRIEF DESCRIPTION OF THE DRAWINGS

The foregoing, as well as further characteristics and advantages of the present disclosure, will become better apparent from the following description of some preferred, but not exclusive, embodiments of an automatic optical inspection system according to the disclosure, illustrated by way of non-limiting examples with the aid of the accompanying drawings, wherein:

FIG. 3 is a block diagram of part of a second possible embodiment of an automatic optical inspection system according to the disclosure;

FIG. 4 is a schematic representation of a possible detailed configuration of the automatic optical inspection system of FIG. 3;

DETAILED DESCRIPTION OF THE DRAWINGS

Figure 1:
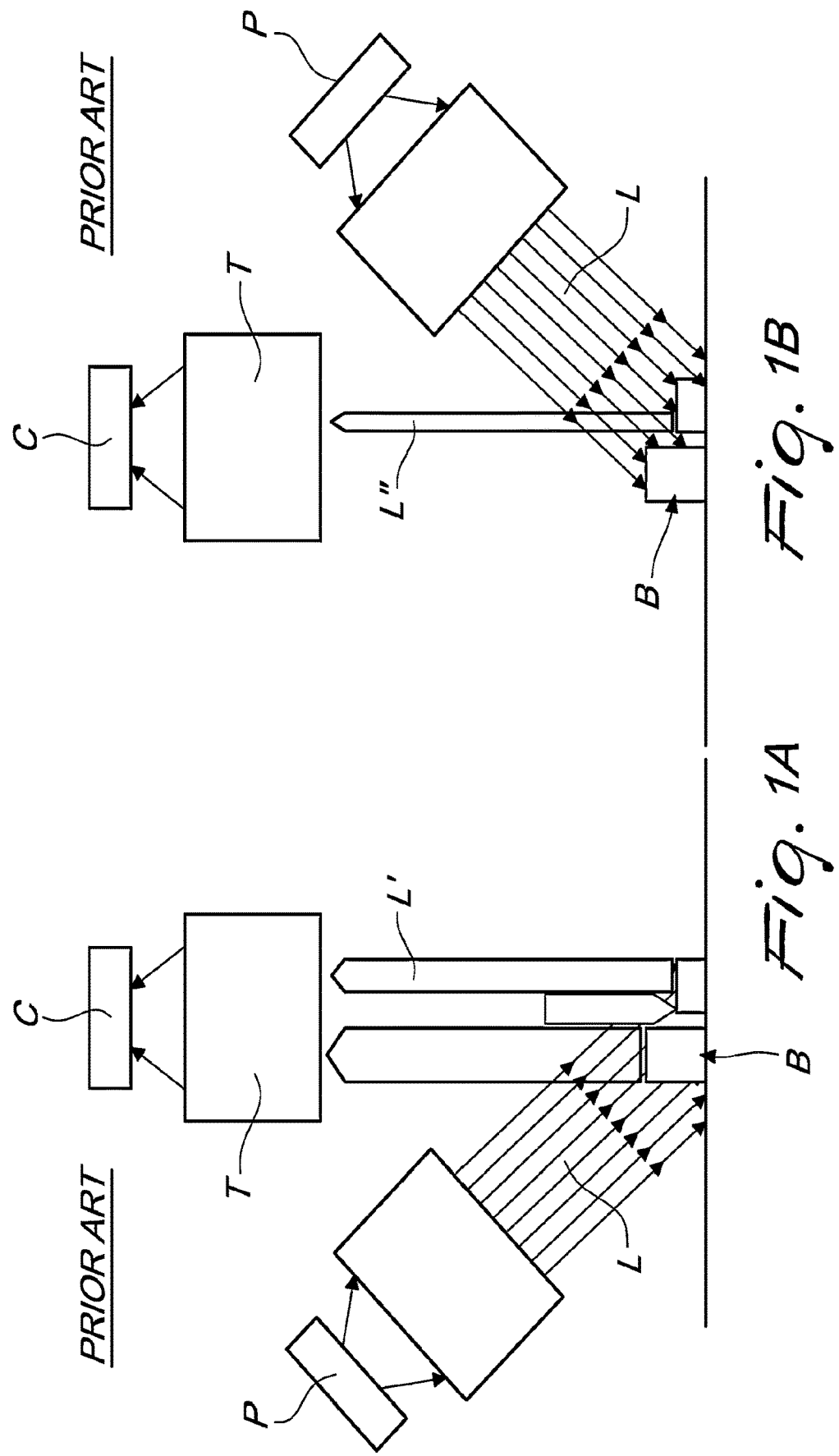
FIGS. 1A and 1B are schematic representations of an automatic optical inspection system according to the state of the art.

With reference to the cited figures, the automatic optical inspection system, particularly for electronic assemblies, generally designated by the reference numeral 1 or 10 or 100 (depending on the embodiment), comprises one or more light sources 21, 22 configured to emit a light 2, 3 toward a field of view 11 wherein an object B to be inspected is placed, and more precisely in such a way that the emitted light 2, 3 is reflected by the object B to be inspected.

In the preferred embodiments, the automatic optical inspection system 1, 10, 100 is configured for the inspection of electronic assemblies, such as electronic boards and the like, and therefore the object B consists in an electronic assembly. However, in other embodiments, the object to which reference is made can be any kind of object.

In particular, the object B to be inspected is placed on a reference plane 111 which is preferably horizontal.

The automatic optical inspection system 1, 10, 100 further comprises at least one digital sensor 31, 32, 33 (e.g. a digital camera and/or a polarized camera or the like) that acquires at least part of the light 2, 3 that is reflected by the object B to be inspected.

The at least one digital sensor 31, 32, 33 is operatively connected to a data processing unit 90 configured to determine physical and/or geometric features of the object B to be inspected on the basis of the light 2', 3AB acquired by said at least one digital sensor 31, 32, 33.

Figure 6:
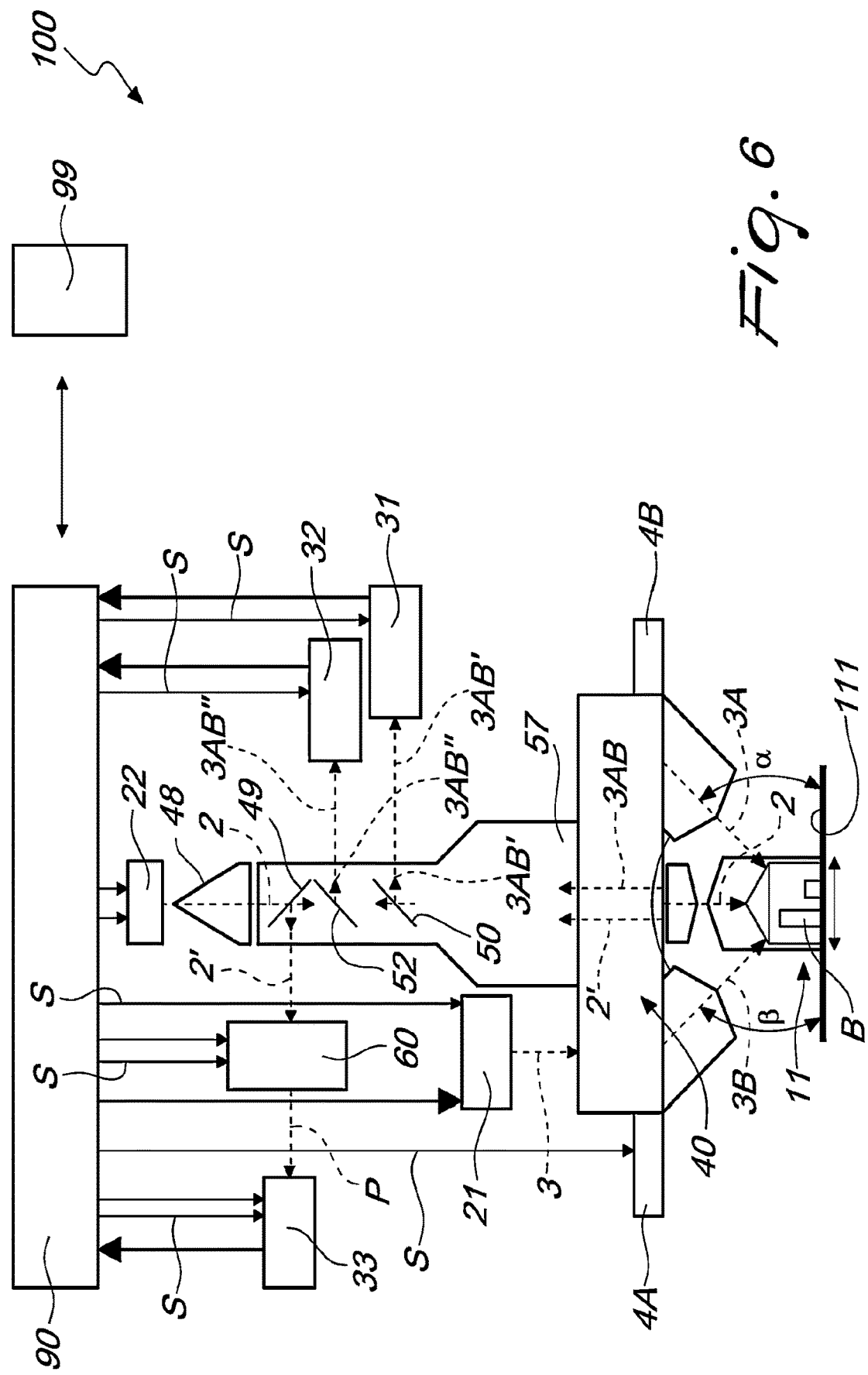
FIG. 6 is a schematic representation of a third possible embodiment of an automatic optical inspection system according to the disclosure.

Preferably, the data processing unit 90 also controls the one or more light sources 21, 22 exchanging signals with them (in FIG. 6 the arrows with solid line indicate signal and/or data exchanges).

The physical and/or geometric features to which reference is made are, for example, the height profile, dimensions, color profile, surface features, etc.

The data processing unit 90 is a programmable electronic device, comprising for instance a field-programmable gate array (FPGA) other suitable integrated circuit. In the preferred embodiments, the data processing unit 90 comprises a FPGA-based real-time control logic and raw data processing system.

According to the disclosure, the one or more light sources 21, 22 comprises at least a laser source 22 configured to generate laser light pulses 2.

According to the disclosure, the at least one digital sensor 31, 32, 33 comprises at least an intensity sensor 33.

According to the disclosure, the automatic optical inspection system 1, 10, 100 further comprises an image intensifier apparatus 60 (which will described in greater detail hereinafter), and a plurality of optical elements 48, 55, 49, 57 which define a path 4 of the laser light pulse 2 from the laser source 22 to the field of view 11 and from the field of view 11 to the image intensifier apparatus 60.

The intensifier apparatus 60 is configured to be switched (in ultra-fast manner) from an open condition to a closed condition and vice versa during the inspection of the object B.

In the above-mentioned open condition, the image intensifier apparatus 60 is configured to project on the intensity sensor 33 an enhanced intensity figure having the same intensity profile of the laser light pulses 2' reflected by the object B to be inspected.

In the above-mentioned closed condition, the image intensifier apparatus 60 is configured to block the laser light pulses 2' reflected by the object B to be inspected.

Figure 2:
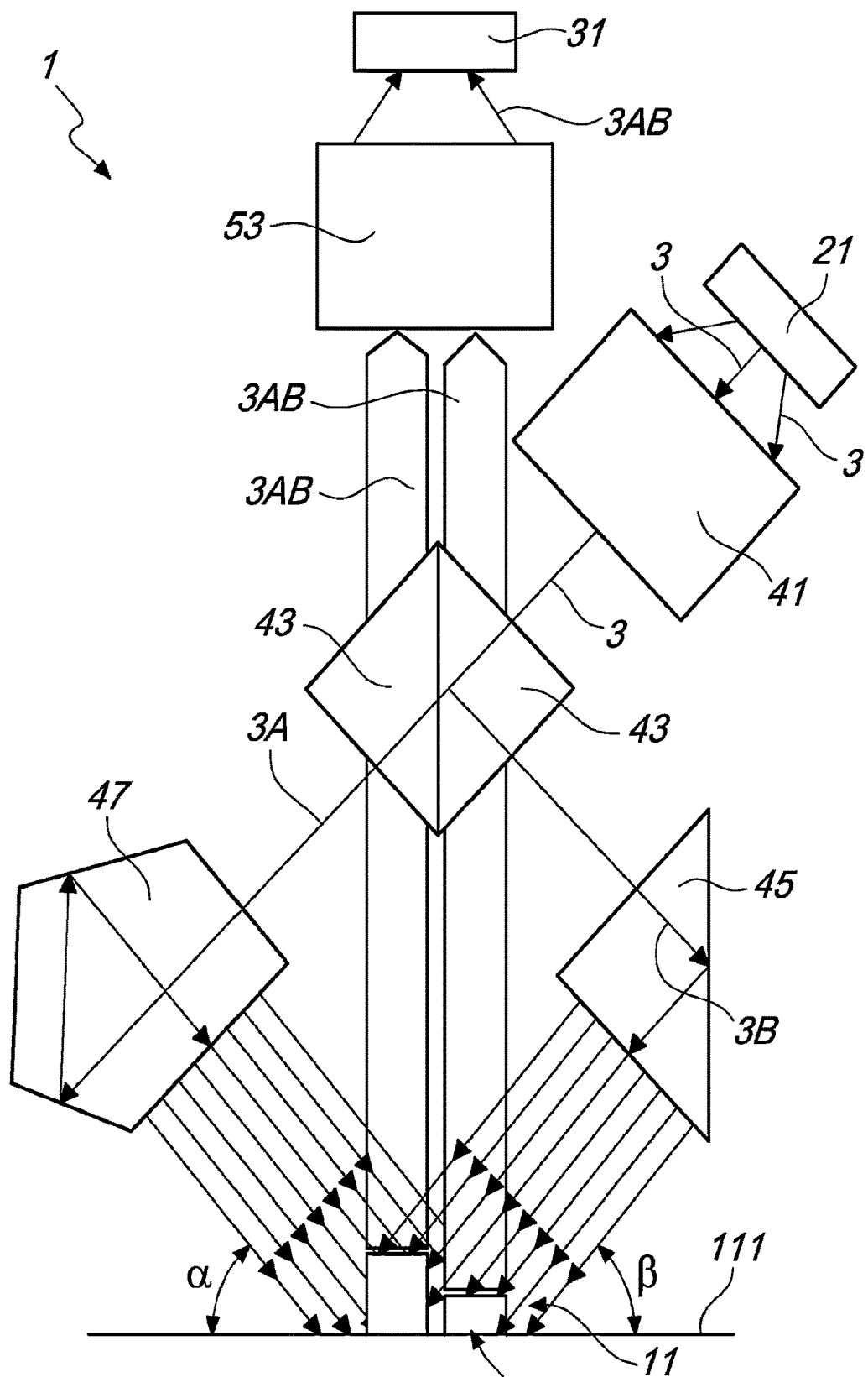
FIG. 2 is a schematic representation of part of a first possible embodiment of an automatic optical inspection system according to the disclosure.

In some embodiments, such as the one depicted in FIG. 2, the one or more light sources 21, 22 comprise also a digital light processing (DLP) projector 21 configured to generate a fringe pattern of light 3.

As known, a fringe pattern is a pattern, preferably a sinusoidal pattern, of light comprising bright and dark band caused by beams of light that are in phase or out of phase with one another and can be generated in a known way.

In these embodiments, the automatic optical inspection system 1 comprises a plurality of optical elements 41, 43, 45, 47 which define a path of the projector light from the projector 21 to the field of view 11 and from the field of view 11 to at least one of the digital sensors 31.

In greater detail, with reference to FIG. 2, the above-mentioned plurality of optical elements 41, 43, 45, 47, 53 comprises:

a first splitting element 43 (such as a beam splitter comprising semi-reflective mirror and/or prisms, designed according to known art) configured to split the fringe pattern of light 3 into a first 3A and a second 3B light beam;

optionally, a first telecentric optics system 41 placed between the projector 21 and splitting element 43;

a first group of reflection and/or collimation elements 47 (such as mirrors, lens, prisms, etc.) configured to reflect and optionally collimate the first light beam 3A on the field of view 11 from a first angle of incidence α;

a second group of reflection and/or collimation elements 45 (such as mirrors, lens, prisms, etc.) configured to reflect and optionally collimate the second light beam 3B on the field of view 11 from a second angle of incidence β; and an ending optic element 53 (preferably a telecentric optics system) configured to convey the first and second light beams which have been reflected 3AB' from the object B, which is placed in the field of view 11, to the first digital sensor 31; preferably that ending optic element 53 comprises a second telecentric optics system placed between the field of view 11 the least one digital sensor 31, 32.

At this point it is useful to specify that the term "telecentric optics system" is understood to reference in a fully general manner any lens (or group of lenses or the like) that has its entrance or exit pupil at infinity.

In practice, in these embodiments, a phase shift profilometry (PSP) is performed by projecting a set of sinusoidal patterns of light onto the surface of the object B, acquiring the reflected light and then applying a known phase unwrapping method.

Preferably, the first digital sensor 31 is a high-resolution camera (having a resolution of at least and not limited to 20 MP and preferably 25 MP) which allows to obtain high-resolution 3D data.

Optionally, in addition or in alternative to the high-resolution camera 31, the digital sensors 31, 32 comprises a polarized sensor camera 32 (for example the polarized sensor camera IMX250MYR-C manufactured by Sony®) which allows to acquire images unaffected by reflections and glare on reflective surfaces like glass, plastic and metal.

In some embodiments, such as the one of FIG. 6, the at least one digital sensor 31, 32 comprises both a high-resolution camera 31 and a polarized sensor camera 32.

In these embodiments, the plurality of optical elements further comprises a second splitting element 50 (e.g. a beam splitter) configured to split the light beams 3AB which are reflected by the object B into two beams: a first reflected beam 3AB' which is directed to the high-resolution camera 31 and a second reflected beam 3AB" which is directed to the polarized sensor camera 32.

In that way, by combining the images acquired by the high-resolution camera 31 and the polarized sensor camera 32, together with the images acquired by intensity sensor 33, the processing unit 90 can obtain a more precise image of the object B to be inspected.

It should be noted that it is also possible to carry out a simplified automatic optical inspection system, which does not form part of the present disclosure, that comprises only the digital light processing (DLP) projector 21 and the relative high-resolution camera 31 and/or polarized sensor camera 32 (without the laser source 22 and the relative image intensifier apparatus 60 and intensity sensor 33).

With reference to FIGS. 3 and 4, the automatic optical inspection system 10 comprises a laser source 22 configured to generate laser light pulses 2, which are preferably ultrashort pulses.

More precisely, the laser light pulses 2 have a duration (on-time) substantially equivalent to the depth of the field of view (in terms of time of flight for that depth). The depth of the field of view is preferably comprised between 2 cm and 6 cm, and the light pulses duration is thus preferably comprised between 66 ps and 200 ps (110 ps in a particularly advantageous embodiment).

In the optimal configuration, the laser source 22 emits the pulses 2 with a frequency in the range of 100 MHz (preferably comprised between 50 MHz and 150 MHZ).

As already mentioned, the automatic optical inspection system 10 further comprises an image intensifier apparatus 60 (hereinafter "image intensifier 60"), an intensity sensor 33 (e.g. a camera and preferably a 25 MP digital camera), and a plurality of optical elements 48, 55, 49, 57 which define a path of the laser light pulse 4 from the laser source 22 to the field of view 11 and from the field of view 11 to the image intensifier 60.

The image intensifier 60 is an apparatus configured to project on the intensity sensor 33 an enhanced intensity figure having the same intensity profile of the laser light pulses 2' reflected by the object B to be inspected.

In greater detail, in the preferred embodiments, the image intensifier 60 configured to be switched from an open condition to a closed condition and vice versa in the sense that it is electronically gated (i.e. functions as a shutter) and is configured to be open at the emission time at which a laser light pulse 2 is emitted from the laser source 22 and to be closed at the end of the time of flight of that laser light pulse 2.

The time of flight to which reference is made is the time of flight of the laser light pulse 2 from the laser source 22 to the reference plane 111 on which the object B is placed and from the reference plane 111 to the electronic image intensifier 60, via said path of the laser light pulse 4 (in other words the time needed by the whole laser light pulse 2, 2' to cover the whole laser light path 4 from the laser source 22 to the image intensifier 60.

In other words, an image intensifier 60 is a device that intensifies low light-level images to light levels that can be seen with the human eye or can be detected by a camera. The image intensifier 60 preferably comprises a vacuum tube with several conversion and multiplication screens.

The general working principle of the image intensifier 60 is the following. When an incident photon hits a light receiving surface 61 (consisting in a light sensitive photocathode screen), photons are absorbed in the photocathode and give rise to emission of electrons e– into the vacuum. These electrons e– are accelerated by an electric field 63 to increase their energy and focus them on a multi-channel plate 64. Inside the multi-channel plate 64, the electrons are multiplied, and accelerated towards an anode screen consisting in a phosphor screen 65. The anode screen contains a layer of phosphorescent material that is covered by a thin aluminum film.

When striking the anode, the energy of the electrons is converted into photons P again. Because of the multiplication and increased energy of the electrons the output brightness of the generate light (image) is higher when compared to the original input light (image) intensity. Electronic Gating (or "gating") is a means by which electrons, which are multiplied and accelerate inside the photomultiplier may be switched ON and OFF in a controlled manner. An electronically gated image intensifier tube functions like a camera shutter, allowing images to pass through when the electronic "gate" is enabled. The gating durations can be very short (nanoseconds even picoseconds).

FIG. 3 is a block diagram that shows the generic functional structure of these embodiments of the automatic optical inspection system 10 comprising the laser source 2, the path of the laser light pulse 4, the image intensifier 60 and the intensity sensor 33.

As can be understood by looking at the FIG. 3, the image intensifier 60 comprises functional groups which allow to implement at least two functions:
- a ultra-fast electronic gate group 6C which comprises means (such as an electronic system) by which the image intensifier 60 may be switched ON and OFF (i.e. switched from the open condition to the closed condition) in a controlled manner (e.g. by varying an electric field 63 within the image intensifier 60); and
- a light amplifier and optical low-pass filter group 6 which is a functional group of electronic and optics devices configured to amplify and integrate an incoming (low intensity) pulsed light (i.e. the laser light pulse 2') over time and to provide in output an intensity image that is measurable by the intensity sensor 33.

The amplifier and optical low-pass filter group 6, in turn, comprises an amplifier group 6A, i.e. one or more electronic and/or optics device configured to amplify the signal of the of the laser light pulse 2', and a low filter and integrator group 6B, i.e. one or more electronic and/or optics devices configured to integrate the signal of the laser light pulse 2' which has been amplified.

FIG. 4 shows a possible detailed embodiment of an automatic optical inspection system 10 according to FIG. 3, wherein a preferred embodiment of the path of the laser light pulse 4 and a preferred embodiment of the image intensifier 60 are visible in detail.

In the embodiment of FIG. 4, the optical elements which define the path 4 of the laser light pulse 2 comprise: a first optical element (e.g. a collimator) 48, a reflective element 55, a partially reflective element 49 that is transparent for the laser pulses 2 towards the field of view 11 and is reflective for the laser light pulses 2' which are reflected by the object B, a telecentric optics system 57, and an ending optical element 58 that conveys the laser light pulses 2' towards the image intensifier 60.

Still in the embodiment of FIG. 4, the image intensifier 60 comprises a photoelectric converter 62 which comprises a light receiving surface 61. The photoelectric converter 62 is configured to receive, at the light receiving surface 61, the laser light pulse 2' and to generate amounts of electric charges e– (i.e. electrons) corresponding to the intensity of the received laser light pulse 2'. In practice, the photoelectric converter 62 converts the photons which constitute the laser light pulse 2' into a flux of electrons e– that has the same intensity profile of the laser light pulse 2'.

In the image intensifier 60, an electric field 63 (preferably with high voltage, comprised between ±50 V and ±200 V) which accelerates the electric charges e– coming from the photoelectric converter 62 in direction of a micro-channel plate (MCP) detector 64 is provided.

By varying the voltage of the electric field 63 the image intensifier 60 can be selectively turned ON (i.e. the shutter/gate can be opened) and turned OFF (i.e. the shutter/gate can be closed): for instance, the voltage of the electric field 63 can be switched from –100V (gate close, i.e. closed condition) to +100V (gate open, i.e. open condition). In practice, the image intensifier 60 comprises an electronic system for switching the image intensifier from the open condition (turned ON) wherein the incoming laser light pulses 2' are amplified and projected on the intensity sensor 33 to the closed condition (turned OFF) wherein the incoming laser light pulses 2' are blocked, and vice versa.

Therefore, in this embodiment, the ultra-fast electronic gate group 6C comprises the above-mentioned electronic system.

The micro-channel plate detector 64 is configured to multiply the electric charges e– via a secondary emission of electric charges e– in direction of a phosphor screen 65. In practice, the micro-channel plate detector 64 functions as a particle amplifier, turning each single incoming electric charge e– into a plurality of electric charges e–. An electric field is applied across the micro-channel plate detector 64.

By varying the voltage V2 of the electric field applied across the micro-channel plate detector 64 it is possible to vary the gain (i.e. the intensity of the secondary emission of electric charges e– in direction of a phosphor screen 65 and so the intensity of the image generated on the phosphor screen 65).

Therefore, in this embodiment, the amplifier group 6A comprises the photoelectric converter 62 and the micro-channel plate 64, arranged in series.

The phosphor screen 65, on which the electric charges e– emitted by the micro-channel plate 64 are directed, is configured to convert the incoming electric charges e– into photons p which are emitted toward the intensity sensor 33, preferably passing through an output optical element 66. An electric field is applied between the micro-channel plate detector 64 and the phosphor screen 65 in order to accelerate the electric charges e– in direction of the latter.

It has to be noted that the image intensifier apparatus 60 comprises electric fields with three different voltages, namely:
- a first voltage V1 between the photoelectric converter 62 and the micro-channel plate detector 64,
- a second voltage V2 within the micro-channel plate detector 64, and
- a third voltage V3 between the micro-channel plate detector 64 and the phosphor screen 64.

The phosphor comprised in the phosphor screen 65 has a decay time in the order of the some ms and this allows to integrate a low intensity pulsed light over time and obtain a measurable intensity image.

Therefore, in this embodiment, the low filter and integrator group 6B comprises a phosphor screen 65.

Figure 5A:
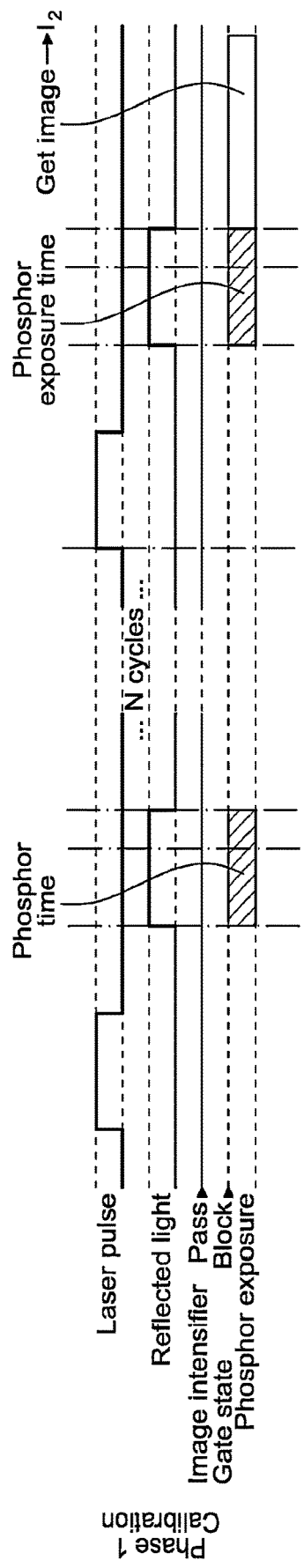
FIGS. 5A and 5B are timeline diagrams showing the image acquisition system signal timing in the configuration of FIG. 4.
Figure 5B:
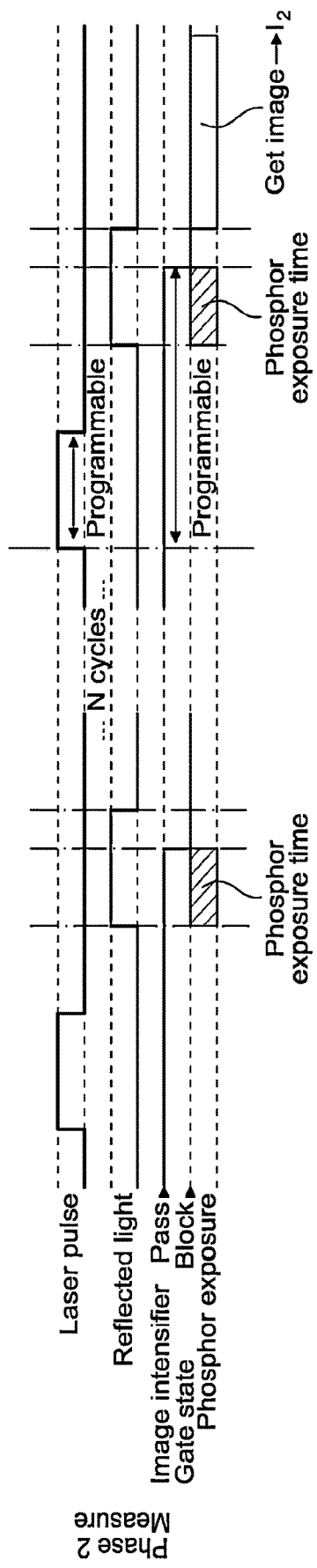

FIGS. 5A and 5B show the timing concept of the functioning of the image intensifier 60.

In the calibration phase (FIG. 5A), an object B to be inspected is placed in the field of view 11 on the reference plane 111 and the electronic gate is open (i.e. the image intensifier 60 is turned ON, in open condition) to let pass through the whole laser light pulse 2' which has been reflected by the object B so that the phosphor screen 65 absorbs electric charges e– for a time corresponding to the entire length of the laser pulse 2. Consequently, the intensity sensor 33 acquires an image the intensity of which depends on the reflectivity of the surfaces of the object B.

In the measure phase (FIG. 5B) the electronic gate is open for the time which corresponds to the time required for the laser pulse 2 to travel from the laser source 22 to the reference plane 111 and back to the image intensifier 60. In that way, if a reflecting surface was placed at a distance bigger than defined by the time of the gate aperture no light would be intensified by the image intensifier 60, but since the reflecting surfaces of the object B are closer (higher than the reference plane 111, since the object B is placed on the reference plane 111), the reflected laser light pulse 2' arrive at the image intensifier 60 before the electronic gate is closed (i.e. before the image intensifier 60 in switched into the closed condition).

Consequently, the phosphor screen 65 absorbs electric charges e– for a time which is proportional to the distance at which the reflecting surface of the object B is placed (i.e.

proportional to the high of the object B). The intensity information acquired during the calibration phase allows to measure the reflectivity of the object B and the ration between the intensities acquired in the calibration phase and in the measure phase allows to determine the distance of the reflective surfaces of the object B (i.e. the height of the object B) when compared to the depth of field which is defined by the laser pulse duration. Consequently, the intensity sensor 33 acquires an image having an intensity profile corresponding to the height profile of the object B.

Opportunely, a series of laser pulses 2 is emitted to scan the whole object B to be inspected, so that to each reflected laser light pulse 2' (or group of reflected laser light pulses 2') corresponds to a point of the object B and is associated to a height and produces, in the enhanced intensity figure acquired by the intensity sensor 33, a pixel the intensity of which is proportional to the height of the point.

In an advanced embodiment, shown in FIG. 6, the automatic optical inspection system 100 comprises both the laser source 22 that emits laser light pulses 2 and the DLP projector 21 that emits the fringe pattern of light 3.

This automatic optical inspection system 100 also comprises: the high-resolution camera 31 and the polarized sensor camera 32 for acquiring at least part of the light 3AB', 3AB" that is emitted by the DLP projector 21 and reflected by the object B; the intensity sensor 33 and the image intensifier apparatus 60 that project on the intensity sensor 33 an enhanced intensity figure having the same intensity profile of the laser light pulse 2' that is reflected by the electronic object B.

In this embodiment, a plurality of optical elements 40, 49, 50, 51, 57 define a path of the projector light (from the projector 21 to the field of view 11 and from the field of view 11 to the high-resolution camera 31 and to the polarized sensor camera 32) and a path of the laser light pulse (from the laser source 22 to the field of view 11 and from the field of view 11 to the image intensifier apparatus 60).

The path of the projector light and the path of the laser light pulse share some of the optical elements 40, 50, 51, 57, i.e. there are some optical elements 40, 50, 51, 57 which contribute to define both the path of the projector light and the path of the laser light pulse.

In particular, among the optical elements 40, 50, 51, 57 which define the path of the projector light there is at least a splitting element 50 (i.e. a beam splitter) that splits the light beams reflected 3AB by the object B into a first reflected beam 3AB' which is directed to the high-resolution camera 31 and a second reflected beam 3AB" which is directed to the polarized sensor camera 32.

Among the optical elements, a group of optical elements 40 is configured to split the fringe pattern of light 3 emitted by the projector 21 into a first light beam 3A directed on the field of view 11 from a first angle of incidence α, and a second light beam 3B directed on the field of view 11 from a second angle of incidence β.

Preferably, the same group of optical elements 40 is configured in such a way that the laser light pulse 2 arrives in the field of view 11 perpendicularly to the reference plane 111 on which the object B is placed.

In greater detail, in the embodiment of FIG. 6, the optical elements comprise:
 an output optic element of the laser source 48;
 a first partially reflective element 49 that is transparent for the laser pulses 2 towards the field of view 11 and is reflective for the laser light pulses 2' which are reflected by the object B, and that reflects the reflected laser light pulses 2' towards the image intensifier apparatus 60;

a second partially reflective element 52 that is transparent for the laser light pulses 2, 2' and that reflects the projector light (i.e. first reflected beam 3AB') that is reflected by the object B towards the polarized sensor camera 32;
 the splitting element 50 that redirects the first reflected beam 3AB' towards the high-resolution camera 31 and that lets pass the second reflected beam 3AB" to the second partially reflective element 52;
 a telecentric optics system 57; and
 the above-mentioned group of optical elements 40.

However, the paths of the projector light and of the laser light pulse can be different and can comprise different optical elements: the optical elements and their positions may be any according to the requirements and the state of the art.

In this embodiment, the data processing unit 90 is configured to combine the acquisitions of the high-resolution camera 31, the polarized sensor camera 32 and the intensity sensor 33 so as to obtain a high-quality shadow and reflection free 3D surface scan of the object B to be inspected.

In general, the automatic optical inspection system, 1 10, 100 is capable of acquiring 3D measurements and absolute phase information, which are combined with the PSP's 3D phase to obtain absolute phase information (and high precision height values) of the measured surface.

In the final analysis, in the advanced embodiment, the automatic optical inspection system 100 (or probe) provides a plurality of images wherein the color coding is replaced with a height (or depth) coding, and more precisely a stream of images comprising: an image of the object B acquired by the high resolution camera 31, an image wherein each pixel is associated the height of the corresponding point of the object (obtained by the intensity sensor 33), one or more images containing the information acquired by the polarized sensor camera 32.

Optionally, the automatic optical inspection system 1, 10, 100 comprises one or more (preferably two) indirect illumination units 4A, 4B configured to illuminate the object B from different angles.

In the preferred embodiments, the data processing unit 90 controls the light sources 21, 22, 4A, 4B the digital sensors 31, 32, 33 and the image intensifier apparatus 60 (if present) by means of signals which comprises high speed synchronizing signals S.

Optionally, the automatic optical inspection system 1, 10, 100 is controlled by a remote controlling system 99, for example via a TCP/IP communication system (e.g. by means of an Ethernet cable).

The operation of the automatic optical inspection system 1, 10, 100 is clear and evident from what has been described.

In substance, the optical inspection method for objects B, in particular electronic assemblies, electronic boards and the like, comprises a measure phase that comprises the steps of:
 emitting at least a laser pulse 2 toward a field of view 11 wherein an object B to be inspected is placed, so that the laser pulse 2 is reflected by the object B;
 amplifying at least part of the laser light pulse 2' reflected by the object B by means of an intensifier apparatus 60 so as to create an enhanced intensity figure;
 acquiring the enhanced image by means of an intensity sensor 33;
 determining physical and/or geometric features of the object B to be inspected on the basis of the enhanced intensity figure acquired by said sensor.

During the measure phase, the intensifier apparatus 60 is switched from an open condition wherein the intensifier apparatus 60 amplify the laser light pulse 2' reflected by the object B to a closed condition wherein the intensifier apparatus 60 blocks said laser light pulse 2', so that the intensity of enhanced image depends on distance of the reflecting surface of the object B from the intensifier apparatus 60.

Preferably, the intensifier apparatus 60 is in said open condition at the emission time at which the laser light pulse 2 is emitted from the laser source 22 and is switched into said closed condition at the end of the time of flight of the laser light pulse 2.

Preferably, the optical inspection method further comprises a calibration phase that comprises the steps of:
  placing the object B to be inspected in the field of view 11 on the reference plane 111,
  emitting at least one laser light pulse 2' toward the field of view 11 while the image intensifier 60 is in open condition so as let pass through and amplify the whole laser light pulse 2' which has been reflected by the object B, so that the intensity sensor 33 acquires an image the intensity of which depends on the reflectivity of the surfaces of the object B.

The distance of the reflecting surfaces of the object 1 from the intensifier apparatus 60 (and therefore the height of the object B) is determined on the basis of the ration between the intensities acquired in the calibration phase and in the measure phase.

In some embodiments, the measure phase of the optical inspection method further comprises the steps of:
  emitting a fringe pattern of light 3, by means of a DLP projector 21, towards the field of view 11 so that the fringe pattern of light 3 is reflected by the object B to be inspected;
  acquiring at least part of the light fringe pattern of light 3 reflected by the object B by means of at least one digital sensor 31, 32, which comprises a high-resolution camera 31 and/or a polarized sensor camera 32 (preferably both);
  combining the acquisitions of said digital sensor 31, 32 and of the intensity sensor 33 to determine physical and/or geometric features of the object B, as already explained above.

In practice it has been found that the automatic optical inspection system according to the present disclosure achieves the intended aim and objects, since it allows to improve the acquisition performance with respect to the prior art.

A further advantage of the automatic optical inspection system according to the disclosure resides in that it is capable of improving the acquisition speed.

Another advantage of the automatic optical inspection system according to the disclosure resides in that it makes it possible to avoid measurement errors caused by multiple reflections among components.

Another advantage of the automatic optical inspection system according to the disclosure resides in that it is highly reliable, relatively easy to manufacture and at competitive costs.

The disclosure thus devised is susceptible of numerous modifications and variations, all of which are within the scope of the inventive concept; all the details may furthermore be replaced with other technically equivalent elements.

In practice, the materials used, as well as the dimensions, may be any according to the requirements and the state of the art.

Where technical features mentioned in any claim are followed by references signs, the reference signs have been included for the sole purpose of increasing the intelligibility of the claims and accordingly, neither the reference signs nor their absence have any limiting effect on the technical features as described above or on the scope of any claim elements.

Scope of the disclosure is thus indicated by the appended claims, rather than the foregoing description, and all changes that come within the meaning and range of equivalence of the claims are therefore intended to be embraced therein.

The invention claimed is:

1. An automatic optical inspection system comprising:
  one or more light sources configured to emit a light toward a field of view wherein an object (B) to be inspected is placed, and
  at least one digital sensor that acquires at least part of the light reflected by the electronic assembly (B) to be inspected,
  said at least one digital sensor being operatively connected to a data processing unit configured to determine physical and/or geometric features of the object (B) on the basis of the light acquired by said digital sensor,
  wherein said one or more light sources comprises a laser source configured to generate laser light pulses,
  in that said at least one digital sensor comprises an intensity sensor,
  and in that said automatic optical inspection system further comprises:
    an image intensifier apparatus, and
    a plurality of optical elements which define a path of the laser light pulse from the laser source to the field of view and from the field of view to the image intensifier apparatus,
  wherein said image intensifier apparatus is configured to be switched from an open condition to a closed condition, and vice versa, during the inspection of the object (B),
  in said open condition, said image intensifier apparatus being configured to project on the intensity sensor an enhanced intensity figure having the same intensity profile of the laser light pulses reflected by the object (B) to be inspected, and
  in said closed condition, said image intensifier apparatus being configured to block the laser light pulses reflected by the object (B) to be inspected;
  wherein said image intensifier apparatus comprises an amplifier and optical low-pass filter group configured to integrate an incoming pulsed light over time and to provide an intensity image that is measurable by the intensity sensor;
  wherein said amplifier and optical low-pass filter group comprises a low filter and integrator group configured to integrate the signal of the laser light pulse;
  wherein said low filter and integrator group comprises a phosphor screen comprising a phosphor having a decay time configured to integrate the incoming pulsed light over time and obtain a measurable intensity image.

2. The automatic optical inspection system according to claim 1, wherein said image intensifier apparatus is configured to be in said open condition at the emission time at which the laser light pulse is emitted from the laser source and to be in said closed condition at the end of the time of flight of the laser light pulse,
  said time of flight being the time of flight of the laser light pulse from the laser source to a reference plane on which the electronic object (B) is placed and from the reference plane to the electronic gate, via said path of the laser light pulse.

3. The automatic optical inspection system according to claim 1, wherein said image intensifier apparatus is switched from said open condition to said closed condition, and vice versa, by an electronic system which varies an electric field in the intensifier apparatus.

4. The automatic optical inspection system according to claim 1, wherein said image intensifier apparatus comprises:
a photoelectric converter for receiving, at a light receiving surface, the laser light pulse and generating amounts of electric charges (e−) corresponding to an intensity of the received laser light pulse, and
an electric field) which accelerates said electric charges (e−) coming from said photoelectric converter in direction of a micro-channel plate detector that is configured to multiply the electric charges (e−) via a secondary emission of electric charges (e−) in direction of the phosphor screen,
wherein said phosphor screen is configured to convert said incoming electric charges (e−) into photons (p) which are emitted toward the intensity sensor.

5. The automatic optical inspection system according to claim 4, wherein said image intensifier apparatus comprises:
a first voltage (V1) between said photoelectric converter and said micro-channel plate detector,
a second voltage (V2) within said micro-channel plate detector, and
a third voltage (V3) between said micro-channel plate detector and said phosphor screen.

6. The automatic optical inspection system according to claim 1, wherein said plurality of optical elements which define said path of the laser light pulse are configured such that the laser light pulse arrives perpendicularly to the reference plane on which the object (B) to be inspected is placed.

7. The automatic optical inspection system according to claim 1, wherein said one or more light sources further comprise a DLP projector configured to generate a fringe pattern of light,
and further comprises a plurality of optical elements which define a path of the projector light from said DLP projector to the field of view and from the field of view to at least one of said digital sensors.

8. The automatic optical inspection system according to claim 7, wherein said plurality of optical elements comprises:
a first splitting element configured to split the fringe pattern of light into a first and a second light beam,
a first group of reflection and/or collimation elements configured to reflect the first light beam on the field of view from a first angle of incidence (a),
a second group of reflection and/or collimation elements configured to reflect the second light beam on the field of view from a second angle of incidence (B), and
an ending optic element configured to convey the first and second light beams which have been reflected from the object (B).

9. The automatic optical inspection system according to claim 7, wherein said at least one digital sensor comprises a high-resolution camera and/or a polarized sensor camera.

10. The automatic optical inspection system according to claim 7, wherein said at least one digital sensor comprises a high-resolution camera and a polarized sensor camera, and
said plurality of optical elements further comprises a second splitting element configured to split the light beams reflected by the object (B) into a first reflected beam which is directed to said high-resolution camera and a second reflected beam which is directed to said polarized sensor camera.

11. The automatic optical inspection system according to claim 7, wherein said plurality of optical elements further comprises a first telecentric optics system placed between said DLP projector and said first splitting element.

12. An optical inspection method, the method including a measure phase that includes the following steps:
emitting at least a laser pulse toward a field of view wherein an object (B) to be inspected is placed, so that the laser pulse is reflected by the object (B),
amplifying and integrating over time at least part of the laser light pulse (2') reflected by the object (B) using an intensifier apparatus comprising an optical low-pass filter group, by a phosphor screen comprised in said optical low-pass filter group, so as to create an enhanced intensity figure,
acquiring the enhanced intensity figure using an intensity sensor; and
determining physical and/or geometric features of the object (B) to be inspected on the basis of the enhanced intensity figure acquired by said sensor,
during said measure phase, said intensifier apparatus being switched from an open condition wherein the intensifier apparatus amplifies the laser light pulse reflected by the object (B) to a closed condition wherein the intensifier apparatus blocks said laser light pulse, so that the intensity of the enhanced intensity figure depends on the distance of the reflecting surface of the object (B) from the intensifier apparatus.

13. The optical inspection method according to claim 12, wherein said intensifier apparatus is in said open condition at the emission time at which the laser light pulse is emitted from the laser source and is switched into said closed condition at the end of the time of flight of the laser light pulse,
said time of flight being the time of flight of the laser light pulse from the laser source to a reference plane on which the electronic object (B) is placed and from the reference plane to the electronic gate, via said path of the laser light pulse.

14. The optical inspection method according to claim 12, wherein the method further includes a calibration phase that includes the following steps:
placing the object (B) to be inspected in the field of view on the reference plane, and
emitting at least one laser light pulse toward the field of view while the image intensifier is in open condition so as let pass through and amplify the whole laser light pulse that has been reflected by the object (B), so that the intensity sensor acquires an image the intensity of which depends on the reflectivity of the surfaces of the object (B);
the height of the object (B) being determined on the basis of the ration between the intensities acquired in the calibration phase and in the measure phase.

15. The optical inspection method according to claim 12, wherein said measure phase further includes the following steps:
emitting a fringe pattern of light, using a DLP projector, towards the field of view so that the fringe pattern of light is reflected by the object (B) to be inspected,
acquiring at least part of the fringe pattern of light reflected by the object (B) using at least one digital sensor, and combining the acquisitions of said digital sensor and of said intensity sensor to determine physical and/or geometric features of the object (B).

16. The optical inspection method according to claim 12, wherein said at least one digital sensor comprises a high-resolution camera and/or a polarized sensor camera.

* * * * *